United States Patent [19]
So

[11] Patent Number: 5,666,908
[45] Date of Patent: Sep. 16, 1997

[54] ANIMAL TRAINING DEVICE

[76] Inventor: Ho Yun So, Kwangjang Apt. 8-1006, Yoido-dong, Youngdeungpo-ku, Seoul, Rep. of Korea

[21] Appl. No.: 498,340

[22] Filed: Jul. 5, 1995

[51] Int. Cl.⁶ .................................................. A01K 15/02
[52] U.S. Cl. ..................................................... 119/720
[58] Field of Search .................................. 719/718, 719, 719/720, 721; 340/573

[56] References Cited

U.S. PATENT DOCUMENTS

| | | | |
|---|---|---|---|
| 4,802,482 | 2/1989 | Gonda et al. | 119/29 |
| 4,887,549 | 12/1989 | Powell | 119/718 |
| 4,898,120 | 2/1990 | Brose | 119/721 |
| 5,054,428 | 10/1991 | Farkus | 119/29 |

OTHER PUBLICATIONS

Martin, Paula, "Solving Dog Behavior Problems with Dog Radartron™", 1983.

Primary Examiner—Thomas Price
Attorney, Agent, or Firm—John T. McNelis; Leo V. Novakoski; Fenwick & West LLP

[57] ABSTRACT

An training collar for conditioning the behavior of an animal employs a radio transmitter in conjunction with a microprocessor-based receiver unit mounted on the collar to provide enhanced control over the level of electrical stimulation delivered to the animal through collar mounted electrodes. The transmitter generates control signals including a stimulation level code, and a detector in the receiver unit extracts the stimulation level codes from the control signal and couples them to the microprocessor. The microprocessor implements a control program to generate trains of voltage pulses having widths determined by the stimulation level code. The generated train of voltage pulses control current flow in a transformer based power delivery circuit to generate voltage pulses at the collar electrodes having peak to peak voltages determined by the widths of the voltage pulses in the generated voltage pulse train. The number of different stimulation levels for a given voltage range is limited only by the number of bits used to specify the stimulation level code in the control signal, and thus provides greater control over increments in the level of stimulation applied to the animal.

7 Claims, 5 Drawing Sheets

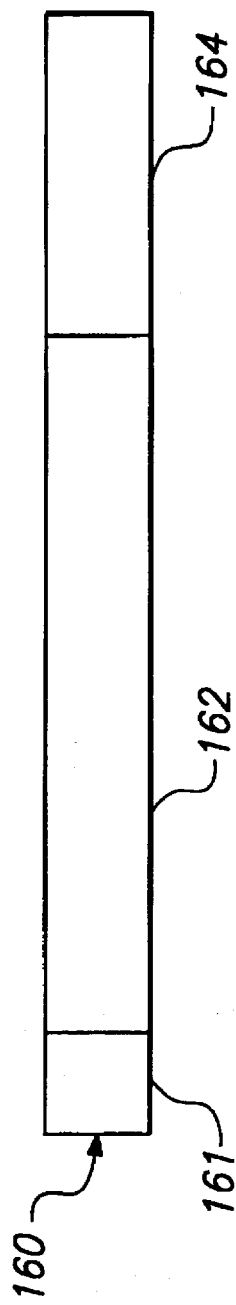
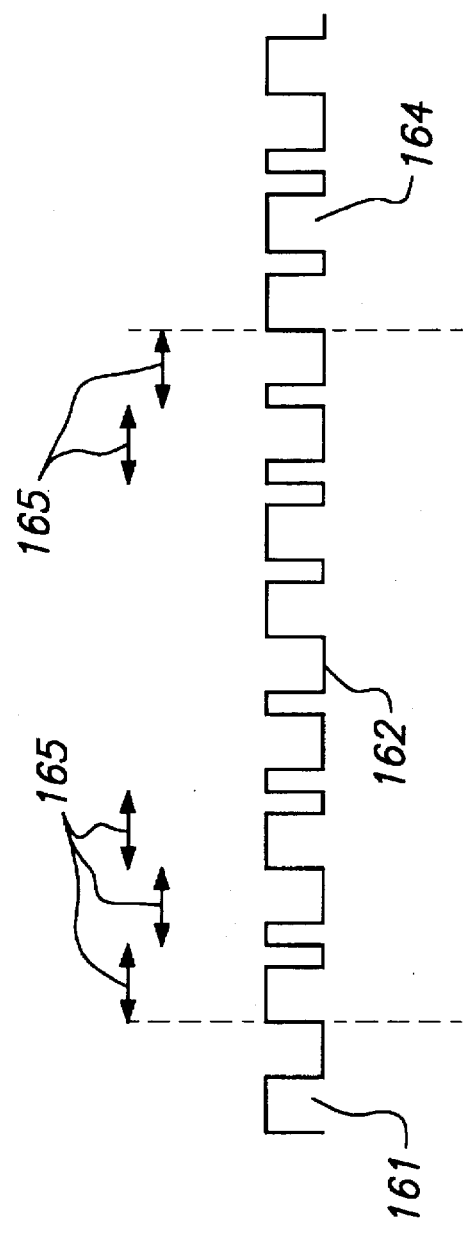

ANIMAL TRAINING DEVICE

BACKGROUND OF THE INVENTION

1. Technical Field

The present invention relates to the field of animal training devices and in particular to radio controlled animal collars for providing electrical stimulation to the animal being trained in order to condition the animal's behavior.

2. Related Art

Radio-controlled animal training collars for conditioning an animals behavior through electrical stimulation are known. Conventional collars typically use a radio transmitter operated by a trainer to trigger an electrical circuit attached to an animal's collar. A radio receiver in the collar is coupled to the electrical circuit, which has a pair of electrodes positioned to contact the animal's skin. The receiver couples signals from the transmitter to the electrical circuit, triggering the circuit to apply electrical stimulation to the animal in the form of voltage pulses.

In order to be effective, an animal training collar must be able to deliver sufficient power to gain the animal's attention without injuring the animal. The necessary power level depends on the size of the animal, its level of activity, and the other stimuli competing with the trainer for the animal's attention. If the electrical stimulation applied to the animal has too little power, the animal will not respond and the collar will be ineffective for training purposes. On the other hand, if the power level is set too high, the animal may be injured or sufficiently frightened that it will refuse to respond to the trainer at all. Conventional animal training collars provide only limited control over the power of the electrical stimulus provided to the animal being trained, and are thus of limited value for training purposes.

Space and weight constraints limit known animal training collar to providing only a few levels of electrical stimulation to the animal. Each known device includes a transistor switch that controls the current in the primary of a transformer, the secondary of which forms the electrodes of the training collar. Trains of voltage pulses are applied to the input of the transistor switch, and the level of electrical stimulation at the electrodes is adjusted by altering the height (voltage) of the pulses, the frequency with which the pulses are delivered to the transistor switch, or the duration (time) that the voltage pulse train is applied to the transistor switch.

For example, one device drives the transistor switch with a fixed frequency train of voltage pulses, each pulse having a fixed pulse height (voltages) and pulse width. The stimulation level is adjusted by changing the DC bias at the transistor switch so that the effective voltage driving the transistor switch is adjusted to one of several levels. The number of different voltage levels that can be selected is thus limited by the number of different bias circuits that can be connected to the input of the transistor switch.

Another device, disclosed in U.S. Pat. No. 4,802,482, uses trains of voltage pulses having fixed voltages, pulse-widths, and frequency to control the transistor switch. In this case, the stimulus power is adjusted by increasing or decreasing the duration (length) of the pulse train, which increases the number of fixed voltage pulses generated at the electrodes. For this purpose, the electrical circuit includes a gated oscillator circuit having a selected frequency. The input of oscillator is driven by one of three RC circuit elements selected by signals from the trainer's transmitter and the output is coupled to the transistor switch. The length of the pulse train applied to the electrodes is adjusted by applying a signal voltage to the oscillator input through one of the RC circuit elements.

U.S. Pat. No. 5,054,428 discloses a training collar in which the strength of the electrical stimulus is adjusted by driving the transistor switch with trains of voltage pulses having different frequencies. For this purpose, the collar includes a circuit in which one of three different gated oscillators, each having a different oscillation frequency, is coupled to the transistor switch.

In these devices, the level of stimulation is selected by driving the transistor switch with circuits capable of producing only a few different voltage pulse trains. For example, the number of stimulation levels in the first device is set by the number of different bias circuits present in the collar circuitry. In the '482 patent, this number is determined by the number of RC circuit elements, and, in the '428 patent, this number is determined by the number of gated oscillators in the circuit. Due to the limited space available in a collar and the need to provide lightweight devices, there are limits to the number of circuit elements that can be added to the collar. Consequently, these approaches limit the number of different power levels available to the trainer for controlling the animal.

There is thus a need for an animal training collar that can provide greater control over the level of electrical stimulation applied to an animal in training.

SUMMARY OF THE INVENTION

The present invention is a method and system that provide greater control over the level of electrical stimulation delivered to an animal being trained. The system comprises a radio transmitter and an animal collar that includes a radio receiver, a detector, a microprocessor, and a transformer type power delivery circuit coupled to electrodes in the collar. The transformer type power delivery circuit includes a transistor switch that controls current in the primary of a transformer, the secondary of which forms the collar electrodes that electrically stimulate the animal. The microprocessor is programmed to generate a train of voltage pulses having pulse widths that are adjusted through a control signal generated at the radio transmitter. The number of different stimulation levels is limited only by the size of the data field in the control signal used to program the microprocessor.

The microprocessor is programmed to generate a train of voltage pulses at a fixed frequency and voltage but having pulse widths that are determined by a stimulation level code extracted from the control signal by the detector. In the preferred embodiment of the invention, a receiver in the collar couples signals from the transmitter to the collar circuitry, and the detector demodulates the received signals for processing by the microprocessor. The microprocessor checks a security code in the received signal to ensure that the signal is intended for it and uses the stimulation level code to set the width of the pulse in a train of voltage pulses. Application of this microprocessor-generated pulse train to the transistor switch generates pulses at the collar electrodes in which each pulse has a peak to peak voltage determined by the programmed width of a corresponding pulse in the microprocessor generated pulse train. Further, the peak to peak electrode voltage can be adjusted in a substantially continuous manner through the programmable width of the microprocessor generated pulses.

BRIEF DESCRIPTION OF THE DRAWINGS

FIGS. 1B, 1C are representations of the code format for the control information generated by the transmitter of FIG. 1A.

DETAILED DISCUSSION OF THE INVENTION

Figure 1A:
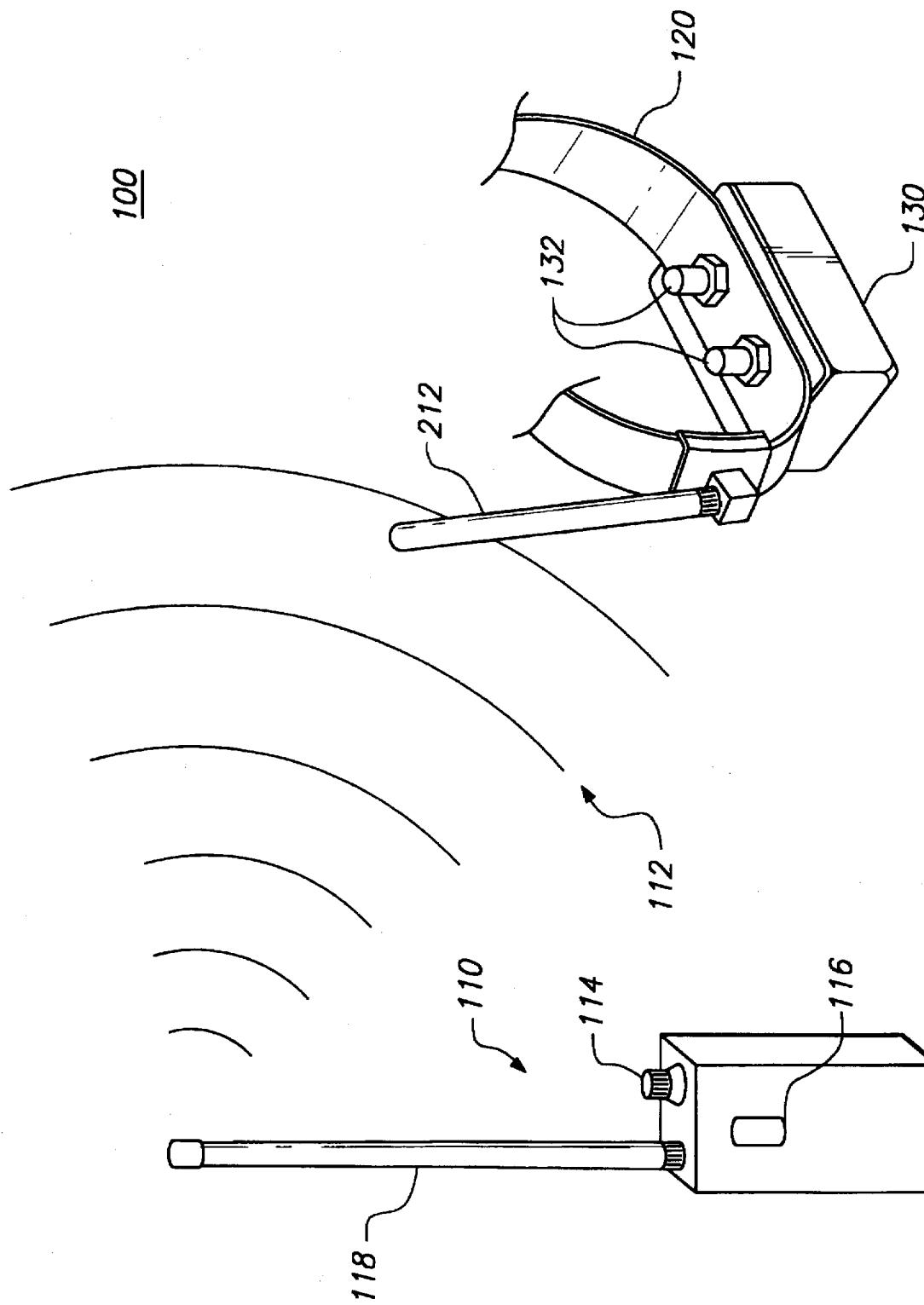
FIG. 1A is a representation of a transmitter and collar, including a receiver, in accordance with the present invention.

Referring to FIG. 1A, there is shown a system 100 suitable for implementing the present invention. System 100 comprises a transmitter 110 and a collar 120 which is worn around the neck of the animal being trained and to which is attached a receiver unit 130. Electrodes 132 of receiver unit 130 extend through collar 120 which is adjusted to bring electrodes 132 into proximity with the skin of the animal being trained.

Transmitter 110 comprises a stimulation adjust control 114 for setting a stimulation level parameter in a transmitted radio signal 112, a power switch 116 for controlling transmission of radio signal 112, and an antenna 118 through which radio signal 112 is transmitted by transmitter 110. Transmitter 110 may employ any of a number of modulation formats for encoding control information in radio signal 112 for communication to receiver unit 130. In the disclosed embodiment of the invention, the control information is digitally encoded, although analog signals may be used as well, provided appropriate analog to digital conversion circuitry is included in receiver unit 130. In the preferred embodiment, control signals 112 are FM signals transmitted at 27 MHz. Receiver unit 130 converts received control signals 112 to an intermediate frequency (IF) of 455 KHz which is amplified and demodulated as described below.

Referring now to FIG. 1B, there is shown a representation of a data packet 160 as may be transmitted to receiver unit 130 by radio signals 112. Data packet 160 includes a header 161 followed by first and second data fields 162, 164 in which control information is stored. Header 161 indicates the start of a new data packet to receiver unit 130 and synchronizes receiver unit 130 to the sequence of high and low states that follow. A security code transmitted in first field 162 identifies the receiver unit to which the control information is being sent, and a stimulation level code transmitted in second field 164 identifies the strength of the electrical stimulation to be applied to collar electrodes 132. In the preferred embodiment, the stimulation level indicated by stimulation adjust controller 114 is converted to digital format by transmitter 110 and stored in second field 164. A security code specific to transmitter 110 is stored in first data field 162 to ensure that data packet 160 is processed only by its intended receiver 130.

Referring now to FIG. 1C, there is shown one example of a demodulated data packet 160. It is noted that many other well-known modulation/demodulation schemes may be used for coding data. In the disclosed scheme, header 161 of data packet 160 is indicated by a 2 millisecond (ms) high state followed by a 2 ms low state. Thereafter, each bit of first and second data fields 162, 164 is represented by a 3 ms long data cell 165 in which digital ones are represented by a 2 ms high state followed by a 1 ms low state, and digital zeroes are represented by a 1 ms high state followed by a 2 ms low state. In the disclosed embodiment, header 161 is followed by a 9-bit identity code in first data field 164 and a 4-bit stimulation code in second data field 164. The 4 bit code allows a trainer to select from among 16 different levels of electrical stimulation for conditioning an animal's response, and the number of different levels of electrical stimulation can be easily expanded by increasing the number of bits in data field 164.

Figure 2A:
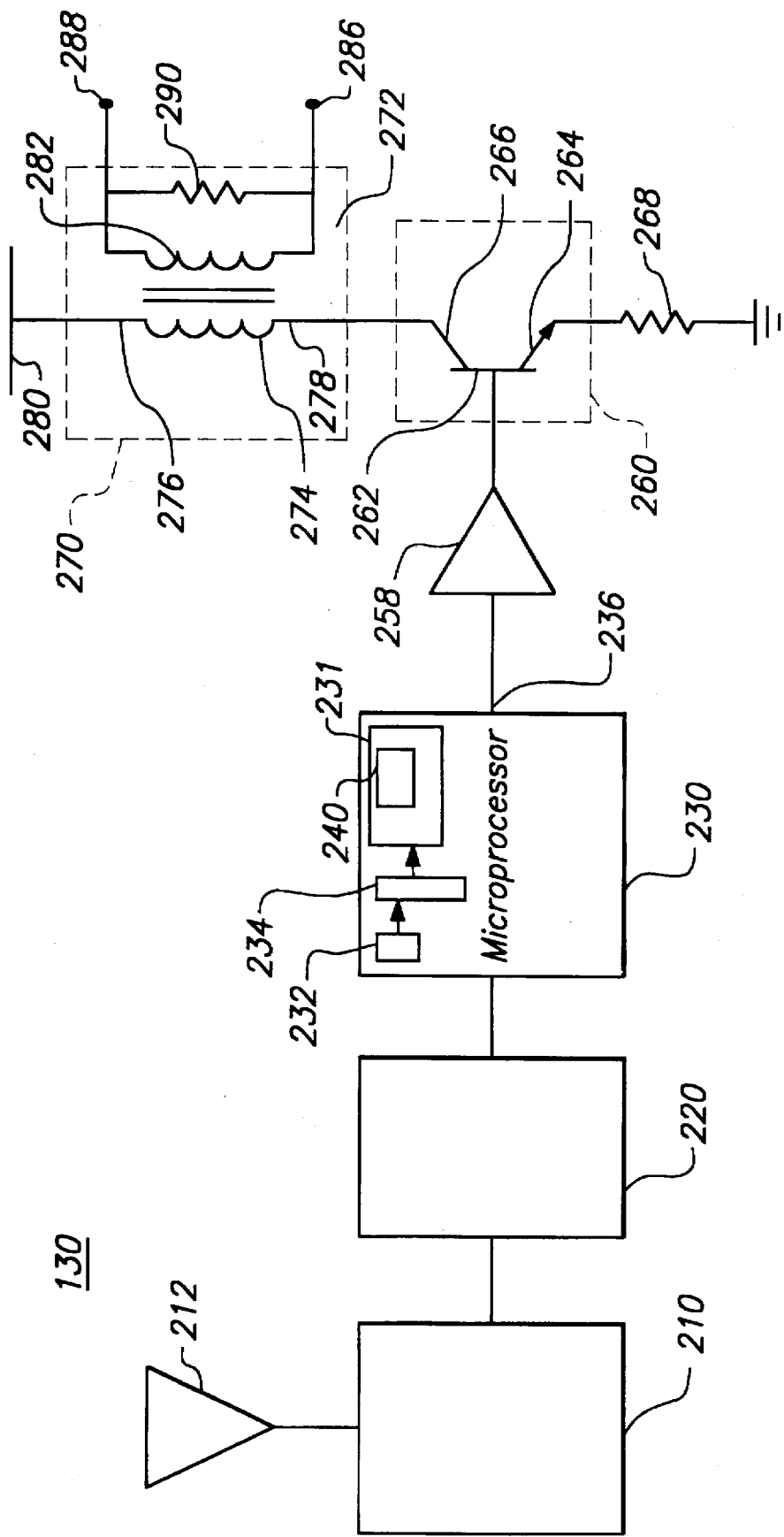
FIG. 2A is a block diagram of the collar circuitry of FIG. 1.

Referring now to FIG. 2A, there is shown a block diagram of receiver unit 130 in accordance with the present invention. Receiver unit 130 comprises an antenna 212, a receiver 210, a detector 220, a microprocessor 230 having an associated memory 231, a buffer 258, a switching circuit 260, and a power delivery circuit 270. In the disclosed embodiment of the invention, radio signals 112 from transmitter 110 are coupled from receiving antenna 212 to detector 220 by receiver 210. Header 161 of data packet 160 synchronizes detector 220, which demodulates received radio signals 112 to extract the identity and stimulation level codes from first and second data fields 162, 164, respectively, and couples the codes to microprocessor 230 for interpretation. In the preferred embodiment of the invention, data from sequentially transmitted data packets 160 may be stored in associated memory 231 until microprocessor 230 is ready to process it. In order to minimize the amount of associated memory 231 necessary for data storage, microprocessor 230 may check the identity code as each data packet 160 is coupled from detector 220, so that only the stimulation level codes of data packets 160 intended for receiver unit 130 are stored.

An oscillator 232 provides timing pulses to increment a counter 234 in microprocessor 230, and a control program 250 stored in memory 231 operates in conjunction with counter 234 to generate a train of voltage pulses. In the disclosed embodiment, control program 250 compares the identity code extracted from first data field 162 with an identity code stored in microprocessor 230 to ensure that data packet 160 is intended for receiver 130. Control program 250 then reads the current value of counter 234 to generate voltage pulses at a specified pulse period (PP), with each voltage pulse having a pulse width (PW) determined by the stimulation level code in the transmitted control signal. The generated train of voltage pulses is coupled through buffer 258 at microprocessor output 236 to switching circuit 260. Switching circuit 260 generates current pulses of duration PW in power delivery circuit 270, which determine the size of voltage pulses at collar electrodes, as described in greater detail below. In the disclosed embodiment, microprocessor 230 is a PROM microcontroller. However, any processor which can be programmed in the manner described below may be used in receiver circuit 130.

Figure 2B:
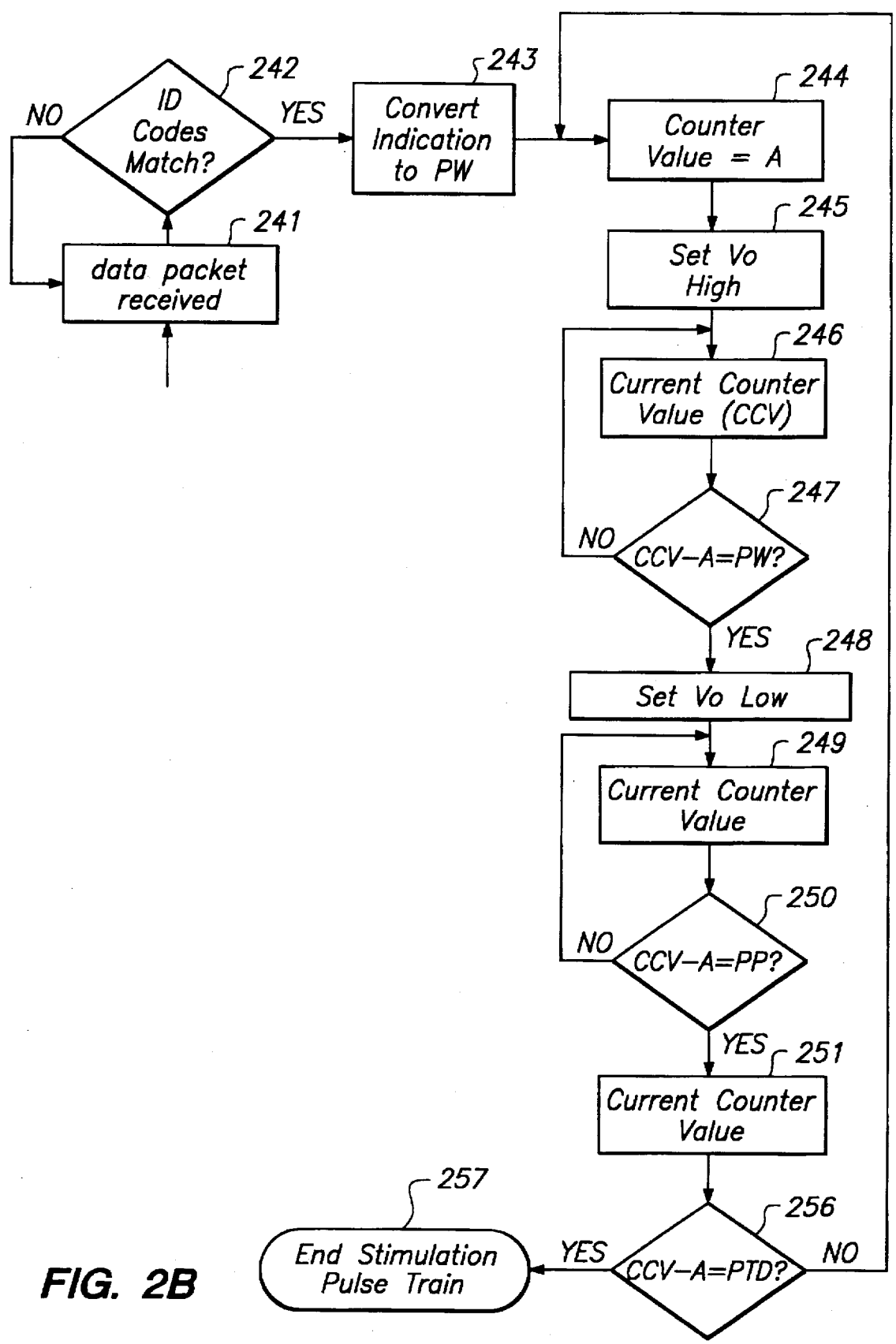
FIG. 2B is a flow chart of the method implemented by the microprocessor of FIG. 2A.
Figure 3:
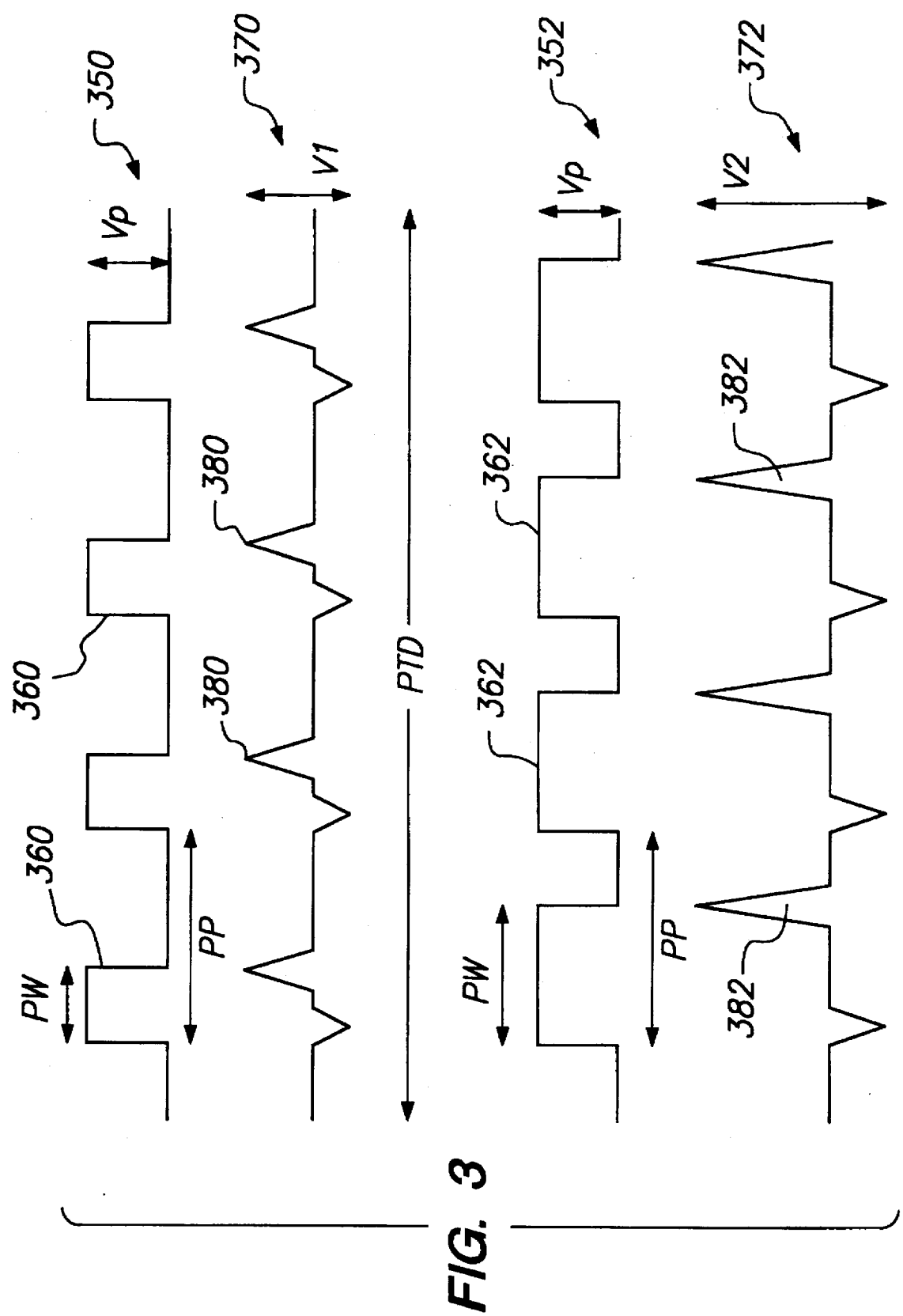
FIG. 3 is a schematic representation of pulse trains generated by the microprocessor at two different levels of electrical stimulation and the corresponding voltage pulses generated at the collar electrodes.

Referring now to FIG. 2B, there is shown a flow chart representing the method implemented by control program 250 to generate pulse trains for driving switching circuit 260. Reference is also made to FIG. 3, which indicates the features identified by PW, PP, PTD in pulse trains 350, 352 generated by control program 250 at two different levels of electrical stimulation. Referring first to FIG. 2B, program 250 receives identity and stimulation level codes from detector 120 and checks 242 whether the identity code extracted from first data field 162 of data packet 160 matches the identity code stored in microprocessor 230. When a match is detected, the stimulation level code extracted from second data field 164 is converted 243 into a pulse width (PW), the current value of counter 234 is written 244 to a variable (A), and microprocessor output 236 is set 245 to $V_O$, which corresponds to the (fixed) height of pulses 360, 362 (FIG. 3). The current value of counter 234 is read 246 at intervals and the difference between the current value and A is compared 247 with PW. When this difference equals PW, the pulse width set by the stimulation level code has been reached and the voltage at output 236 is set 248 low. Counter 234 is again read 249 at intervals and the difference between the current value and A is compared 250 with PP to determine when to begin a new voltage pulse.

After each voltage pulse, the current counter value is read 251 and compared 252 with A to determine whether the pulse train duration (PTD) has been reached. If the difference between the current counter value and A is less than PTD, more pulses 360 (362) must be generated to complete pulse train 350 (352), and program 250 reads 244 a new counter value into A to begin generating the next pulse in the pulse train. When the difference between the current counter value and A equals PTD, the last pulse in the pulse train has been generated and program 250 returns to step 241 to await the next data packet 160.

A typical value for PP is 4 ms and PW may have any value less than PP, although PW is typically in the range of 0.1 to 0.6 ms.

Referring again to FIG. 2A, output 236 of microprocessor 230 is coupled to switching circuit 260 through buffer 258 to control current flow to power delivery circuit 270. Switching circuit 260 provides a pulse of current to power delivery circuit 270 for PW (PW') seconds for each pulse 360 (362) of pulse train 350 (352). In the disclosed embodiment, switching circuit 260 is an NPN transistor 262, having an emitter 264 coupled to ground through a resistor 268 and a collector 266 connected to power delivery circuit 270. However, other switching circuits 260 suitable for use in receiver unit 130 are well known to those skilled in the art.

Power delivery circuit 270 comprises a transformer 272 having a primary circuit 274 and a secondary circuit 282. A first electrode 276 of primary circuit 274 is coupled to a voltage source 280 and a second electrode 278 of primary circuit 274 is coupled to collector 266 of transistor 262. Secondary circuit 282 of transformer 272 comprises first and second electrodes 286, 288 which are coupled through resistor 290 and form electrodes 132 of collar 120. With the voltage at voltage source 280 and the ratio of windings in primary and secondary circuits 274, 282 fixed, the peak to peak voltage generated at electrodes 286, 288 is determined by the duration PW of current pulses through primary circuit 274.

In the preferred embodiment of the invention, voltage source 280 is a battery having a voltage which is typically in the range of 4-10 volts (DC), and the windings ratio is selected to provide a minimum stimulation voltage of approximately 200 volts. The maximum peak to peak voltage at electrodes 286, 288, which is determined by power adjust control 114 through the width of voltage pulses (PW) at microprocessor output 234, can be as high as 2400 to 2700 volts. Thus, a 4-bit second data field 164 provides 16 levels of electrical stimulation between 200 and 2700 volts, separated by approximately 160 volt increments. An 8 bit second data field provides 256 levels of electrical stimulation in increments of approximately 10 volts. Moreover, this is accomplished without increasing the weight or bulk of receiver unit 130.

Referring again to FIG. 3, there are shown output pulse trains 370, 372 generated at electrodes 286, 288 by application of voltage pulse trains 350, 352 to switching circuit 260, produced at output 234 responsive to different stimulation level codes. Output pulse trains 370, 372 comprise pulses 380, 382 having peak to peak voltages $V_1$, $V_2$ determined by widths PW, PW' of pulses 360, 362, respectively. As discussed above, pulse widths PW (PW') may be adjusted in increments limited only by the number of bits used in second data field 164. Consequently, the voltages of output pulses 380, 382 may be almost continuously adjusted according to the level of stimulation necessary for the circumstances.

The lengths PTD, PTD' of pulse trains 350, 352 generated by receiver unit 130 are typically 100 ms. However, multiple pulse trains of length PTD, PTD' can be generated sequentially to create a substantially continuous string of pulse trains 350, 352, provided receiver unit 130 receives a steady stream of control signals 112 having the proper identity code from transmitter 110. In the disclosed embodiment, where data packet 160 comprises a 27 ms long, 9 bit identity code and a 12 ms, 4-bit stimulation code preceded by a 4 ms header 161, up to two identity codes can be received and checked while a 100 ms pulse train 350, 352 is being generated by microprocessor 230. As long as the identity codes of data packets 160 match the internal code of receiver unit 130, the corresponding stimulation level codes can be stored in microprocessor 230 and used to generate a new 100 ms pulse on a subsequent cycle of program 250.

The total length of a string of output pulse trains 370, 372 is thus determined by the length of time for which power switch 116 of transmitter 110 is activated. In the disclosed embodiment, when power switch 116 is depressed on transmitter 110, output pulse trains 370, 372 are generated at a rate of approximately 10 $S^{-1}$. In order to prevent injury to the animal being trained, transmitter 110 may include circuitry to set an upper limit to the number of control signals 112 that can be generated continuously. For example, in the disclosed embodiment, control signals 112 can only be continuously generated for between 8 and 10 seconds. After this period, power switch 116 must be released in order to reset transmitter 110 to generate a new set of control signals 112.

There has thus been provided an animal training device comprising a radio controlled collar having electrodes that can provide a wide range of levels of electrical stimulation. The device uses a receiver unit, including a microprocessor-controlled pulse width modulator, to adjust the width of voltage pulses that drive a power delivery circuit. The pulse widths in turn determine the peak to peak voltage of output pulses generated by a transformer in the power delivery circuit. In the disclosed device, the pulse widths can be incremented with a precision limited only by the number of bits used to specify the level of electrical stimulation in the control signal. Pulse width is selected with a stimulation adjust control in the transmitter, and provides the trainer with greater control over the level of electrical stimulation applied to the animal.

What is claimed is:

1. A system for conditioning behavior in an animal using electrical stimulation, the system comprising:

a transmitter having a control switch for selecting a level of electrical stimulation and means for producing radio signals responsive to a power switch, the radio signals including an indication of the selected level of electrical stimulation;

a collar including electrodes arranged to be brought into proximity to the skin of an animal wearing the collar and a receiver unit coupled to the electrodes for generating electrical stimulation at the electrodes responsive to the radio signals, the receiver unit comprising:
   radio signal detection means for detecting the radio signals and determining the indication of the selected level of electrical stimulation from the detected radio signals;

a processor coupled to the radio signal detection means and including a control program stored in an associated memory, the control program generating a first train of signal pulses, each pulse of the first pulse train having a pulse width determined by the indication of the selected level of electrical stimulation; and a power amplifying circuit having an input coupled to receive the first train of signal pulses and outputs coupled to the collar electrodes, for producing a second pulse train of amplified signal pulses at the collar electrodes wherein each pulse of the second pulse train has a signal strength determined by the width of a corresponding pulse of the first pulse train.

2. The system of claim 1, wherein the power amplifying circuit comprises:

a switch circuit having a signal input forming the input of the power amplifying circuit and a current output, for generating current pulses having a duration determined by the width of the pulses of the first train of signal pulses; and a transformer having a primary circuit and a secondary circuit, the primary circuit being coupled between a voltage source and the current output of the switching circuit and the secondary circuit being connected to the collar electrodes.

3. The system of claim 1, wherein the radio signal detection means comprises:

a radio receiver including an antenna input coupled to a receiver output through a signal filter, for detecting radio signals at the antenna input and coupling a selected wavelength band of the detected radio signals to the receiver output; and a detector having an input coupled to the radio receiver output and an output coupled to the processor, for demodulating the selected wavelength band of detected radio signals to extract the indication of the level of electrical stimulation and coupling the indication to the processor.

4. The system of claim 3, wherein the radio signals produced by the transmitter include an identity code which is extracted by the detector and compared with an identity code stored in the processor, the identity code providing an indication of the radio receiver for which the radio signals are intended.

5. The system of claim 4, wherein the control program of the processor generates the first train of signal pulses only when the identity code extracted from the radio signals matches the identity code stored in the processor.

6. A method for conditioning the behavior of an animal wearing a radio-receiver collar using an electrical stimulation signal produced by a transmitter, the method comprising the steps of:

(a) programming a processor in the radio receiver collar to generate a first train of signal pulses in which each pulse has a width determined by an indication provided to the processor;

(b) transmitting a control signal to the radio receiver collar including an indication of a level of electrical stimulation;

(c) responsive to receipt of the control signal, applying the indication of the level of electrical stimulation to the processor to generate a first train of signal pulses having pulse widths determined by the indicated level of electrical stimulation;

(d) coupling the first train of signal pulses to a transformer to generate a second train of signal pulses, wherein the second train of pulses have peak to peak signal levels determined by the pulse widths of the first train of signal pulses; and (e) applying the second train of signal pulses to skin of the animal at selected times to condition the animals behavior.

7. The method of claim 6, further comprising the step of:

(f) responsive to the animal's failure to respond in a desired manner, repeating steps (b)–(f) with an indication of a new level of electrical stimulation.

* * * * *